(12) United States Patent
Yang et al.

(10) Patent No.: US 11,503,609 B2
(45) Date of Patent: Nov. 15, 2022

(54) PUCCH REPETITION BEFORE RRC CONNECTION SETUP

(71) Applicant: QUALCOMM Incorporated, San Diego, CA (US)

(72) Inventors: Wei Yang, San Diego, CA (US); Hung Dinh Ly, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 17/031,531

(22) Filed: Sep. 24, 2020

(65) Prior Publication Data

US 2021/0100004 A1 Apr. 1, 2021

Related U.S. Application Data

(60) Provisional application No. 62/907,111, filed on Sep. 27, 2019.

(51) Int. Cl.
*H04W 72/04* (2009.01)
*H04L 5/00* (2006.01)
(Continued)

(52) U.S. Cl.
CPC ........ *H04W 72/0493* (2013.01); *H04B 1/713* (2013.01); *H04L 1/1819* (2013.01);
(Continued)

(58) Field of Classification Search
CPC ..... H04B 1/713; H04B 1/7143; H04W 72/02; H04W 72/0413; H04W 72/042;
(Continued)

(56) References Cited

U.S. PATENT DOCUMENTS

| | | | |
|---|---|---|---|
| 2008/0123611 A1* | 5/2008 | Wang | H04B 1/7105 370/342 |
| 2012/0216092 A1* | 8/2012 | Lee | H04L 27/2602 714/E11.131 |

(Continued)

OTHER PUBLICATIONS

International Search Report and Written Opinion—PCT/US2020/052799—ISA/EPO—dated Dec. 15, 2020.
(Continued)

*Primary Examiner* — Dung B Huynh
(74) *Attorney, Agent, or Firm* — Harrity & Harrity LLP/Qualcomm Incorporated

(57) ABSTRACT

Methods, systems, and devices for wireless communication are described. A wireless device may determine a Physical Uplink Control Channel (PUCCH) resource for a PUCCH transmission prior to receiving a dedicated PUCCH resource configuration, determining a repetition level for the PUCCH transmission, and transmit the PUCCH transmission, on at least the PUCCH resource, according to the repetition level. A base station may transmit, to a user equipment (UE), information scheduling a Physical Uplink Control Channel (PUCCH) transmission on a PUCCH resource prior to configuring dedicated PUCCH resources for the UE, determine a repetition level for the PUCCH transmission, transmit, to the UE, an indication of the repetition level, and receive, according to the repetition level, a first repetition of the PUCCH transmission on the PUCCH resource and other repetitions of the PUCCH transmission.

30 Claims, 9 Drawing Sheets

(51) Int. Cl.
  *H04L 27/26* (2006.01)
  *H04B 1/713* (2011.01)
  *H04W 74/08* (2009.01)
  *H04L 1/18* (2006.01)
(52) U.S. Cl.
  CPC ........ *H04L 5/0055* (2013.01); *H04L 27/2607* (2013.01); *H04W 72/042* (2013.01); *H04W 72/0413* (2013.01); *H04W 72/0446* (2013.01); *H04W 72/0453* (2013.01); *H04W 74/0833* (2013.01)
(58) Field of Classification Search
  CPC ......... H04W 72/0446; H04W 72/0453; H04W 72/0493; H04W 74/0833; H04L 1/1819; H04L 1/1858; H04L 1/1861; H04L 1/1864; H04L 27/2601; H04L 27/2607; H04L 41/06; H04L 41/0816; H04L 45/20; H04L 45/38; H04L 47/125; H04L 47/25; H04L 47/32; H04L 5/0007; H04L 5/0053; H04L 5/0055; H04L 5/0094; H04L 67/30; H04L 69/28
  See application file for complete search history.

(56) References Cited

U.S. PATENT DOCUMENTS

| | | | | |
|---|---|---|---|---|
| 2014/0078972 | A1* | 3/2014 | Sorrentino | H04L 27/2613 370/329 |
| 2015/0181259 | A1* | 6/2015 | Zhang | H04N 21/25891 725/62 |
| 2015/0245269 | A1* | 8/2015 | Shao | H04W 72/0413 370/332 |
| 2016/0021694 | A1* | 1/2016 | Pan | H04W 72/0413 370/329 |
| 2016/0183231 | A1* | 6/2016 | Shi | H04W 72/0406 370/329 |
| 2016/0211949 | A1* | 7/2016 | You | H04W 4/70 |
| 2016/0330633 | A1* | 11/2016 | You | H04W 16/26 |
| 2016/0353440 | A1* | 12/2016 | Lee | H04W 74/0833 |
| 2017/0164335 | A1* | 6/2017 | Yamamoto | H04W 72/048 |
| 2017/0180098 | A1* | 6/2017 | You | H04L 5/0053 |
| 2017/0318411 | A1* | 11/2017 | Yamamoto | H04W 72/0406 |
| 2017/0353272 | A1* | 12/2017 | Takeda | H04W 72/0453 |
| 2018/0048348 | A1* | 2/2018 | Gau | H04W 72/0446 |
| 2018/0146438 | A1* | 5/2018 | Yi | H04W 52/267 |
| 2018/0368169 | A1* | 12/2018 | Jung | H04L 1/1861 |
| 2019/0036653 | A1* | 1/2019 | Lunttila | H04L 1/1812 |
| 2019/0158249 | A1* | 5/2019 | Harada | H04W 72/1278 |
| 2019/0182824 | A1* | 6/2019 | Chatterjee | H04W 74/0833 |
| 2019/0261356 | A1* | 8/2019 | Myung | H04W 48/12 |
| 2019/0268961 | A1* | 8/2019 | Tsai | H04B 7/0695 |
| 2019/0297618 | A1* | 9/2019 | Yang | H04W 72/0406 |
| 2019/0313342 | A1* | 10/2019 | Papasakellariou | H04W 52/325 |
| 2019/0313437 | A1* | 10/2019 | Jung | H04W 74/006 |
| 2019/0313458 | A1* | 10/2019 | Zeng | H04W 16/14 |
| 2019/0393988 | A1* | 12/2019 | Bae | H04L 1/1671 |
| 2020/0008156 | A1* | 1/2020 | Yin | H04L 1/1858 |
| 2020/0059390 | A1* | 2/2020 | Zhang | H04L 1/0003 |
| 2020/0107372 | A1* | 4/2020 | Agiwal | H04W 80/02 |
| 2020/0145280 | A1* | 5/2020 | Cirik | H04W 72/14 |
| 2020/0177424 | A1* | 6/2020 | Noh | H04L 5/0053 |
| 2020/0178239 | A1* | 6/2020 | Yi | H04L 5/0053 |
| 2020/0187177 | A1* | 6/2020 | Lee | H04L 1/08 |
| 2020/0205150 | A1* | 6/2020 | Cheng | H04L 1/1861 |
| 2020/0221478 | A1* | 7/2020 | Fakoorian | H04W 72/042 |
| 2020/0259625 | A1* | 8/2020 | Papasakellariou | H04B 7/0639 |
| 2020/0350949 | A1* | 11/2020 | Rico Alvarino | H04W 72/0413 |
| 2021/0014003 | A1* | 1/2021 | Sundberg | H04L 5/0044 |
| 2021/0037519 | A1* | 2/2021 | Matsumura | H04J 13/0074 |
| 2021/0044981 | A1* | 2/2021 | Bhattad | H04J 13/0003 |
| 2021/0058922 | A1* | 2/2021 | Han | H04L 5/0055 |
| 2021/0235308 | A1* | 7/2021 | Zhang | H04L 1/1671 |
| 2021/0274527 | A1* | 9/2021 | Nakamura | H04L 5/0044 |
| 2021/0282137 | A1* | 9/2021 | Wang | H04L 1/1819 |
| 2021/0297221 | A1* | 9/2021 | Lee | H04L 5/0091 |
| 2021/0298051 | A1* | 9/2021 | Khoshnevisan | H04W 72/1273 |
| 2021/0314084 | A1* | 10/2021 | Hwang | H04L 1/0027 |
| 2021/0315000 | A1* | 10/2021 | Li | H04L 1/0004 |
| 2021/0329676 | A1* | 10/2021 | Yang | H04W 4/46 |
| 2021/0392648 | A1* | 12/2021 | Andersson | H04W 72/0493 |
| 2022/0029861 | A1* | 1/2022 | Shahmohammadian | H04W 72/042 |
| 2022/0030443 | A1* | 1/2022 | Chen | H04L 5/0055 |
| 2022/0039072 | A1* | 2/2022 | Babaei | H04W 72/0446 |
| 2022/0046717 | A1* | 2/2022 | Zhang | H04W 74/0833 |
| 2022/0061067 | A1* | 2/2022 | Andersson | H04W 72/1263 |
| 2022/0086032 | A1* | 3/2022 | Park | H04W 72/1289 |
| 2022/0116981 | A1* | 4/2022 | Saber | H04L 1/1896 |
| 2022/0166577 | A1* | 5/2022 | Jiang | H04L 1/08 |
| 2022/0201709 | A1* | 6/2022 | Sun | H04L 5/0094 |
| 2022/0210842 | A1* | 6/2022 | Lei | H04L 1/0003 |

OTHER PUBLICATIONS

Nokia et al., "Remaining Details on NR Physical UL Control Channel", 3GPP Draft, R1-1808966, NR PUCCH, 3GPP TSG-RAN WG1, Meeting #94, 3rd Generation Partnership Project (3GPP), Mobile Competence Centre, 650, Route Des Lucioles, F-06921, Sophia-Antipolis Cedex, France vol. RAN WG1, No. Gothenburg, Sweden, Aug. 20, 2018-Aug. 24, 2018, Aug. 10, 2018 (Aug. 10, 2018), XP051516338, 16 Pages, Retrieved from the Internet: URL:http://www.3gpp.org/ftp/tsg%5Fran/WG1%5FRL1/TSGR1%5F94/Docs/R1%2D1808966%2Ezip [retrieved on Aug. 10, 2018], section "5.1 OCC before dedicated PUCCH resource configuration", section "9.2.5 UE procedure for reporting multiple UCI types", section "9.2.6 UCI repetition procedure".

Wilus Inc: "Remaining Issues on PUCCH", 3GPP Draft, R1-1811450, PUCCH_Final, 3GPP TSG-RAN WG1, Meeting #94bis, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518853, 13 Pages, Retrieved from the Internet: URL:http://www.3gpp.org/ftp/tsg%5Fran/WG1%5FRL1/TSGR1%5F94b/Docs/R1%2D1811450%2Ezip [retrieved on Sep. 29, 2018], p. 10-p. 12.

* cited by examiner

PUCCH REPETITION BEFORE RRC CONNECTION SETUP

CLAIM OF PRIORITY

This application claims the benefit of U.S. Provisional Application No. 62/907,111 filed on Sep. 27, 2019, the entire contents of which are incorporated herein by reference.

BACKGROUND

The following relates to wireless communication and uplink control repetition enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support uplink control repetition enhancements. A method of wireless communication is described. The method may include determining a Physical Uplink Control Channel (PUCCH) resource for a PUCCH transmission prior to receiving a dedicated PUCCH resource configuration, determining a repetition level for the PUCCH transmission, and transmitting the PUCCH transmission, on at least the PUCCH resource, according to the repetition level.

An apparatus for wireless communication is described. The apparatus may include a processor, a memory coupled to the processor, and instructions stored in the memory. The instructions may be executable by the processor to cause the apparatus to determine a Physical Uplink Control Channel (PUCCH) resource for a PUCCH transmission prior to receiving a dedicated PUCCH resource configuration, determine a repetition level for the PUCCH transmission, and transmit the PUCCH transmission, on at least the PUCCH resource, according to the repetition level.

A non-transitory computer readable medium storing code for wireless communication is described. The code may include instructions executable by a processor to determine a Physical Uplink Control Channel (PUCCH) resource for a PUCCH transmission prior to receiving a dedicated PUCCH resource configuration, determine a repetition level for the PUCCH transmission, and transmit the PUCCH transmission, on at least the PUCCH resource, according to the repetition level.

Another apparatus for wireless communication is described. The apparatus may include means for determining a Physical Uplink Control Channel (PUCCH) resource for a PUCCH transmission prior to receiving a dedicated PUCCH resource configuration, means for determining a repetition level for the PUCCH transmission, and means for transmitting the PUCCH transmission, on at least the PUCCH resource, according to the repetition level.

In some examples of the method, apparatuses, or non-transitory computer-readable medium described herein, the PUCCH transmission contains a Hybrid Acknowledge Repeat Request Acknowledgement (HARCK-ACK) message in response to receiving a contention resolution message on a Physical Downlink Shared Channel (PDSCH) in a random access procedure. Some examples of the method, apparatuses, or non-transitory computer-readable medium described herein may further include processes, features, means, or instructions for receiving the repetition level in a Downlink Control Information (DCI) message for scheduling the contention resolution message. In some examples, the repetition level is indicated in a Downlink Assignment Indicator (DAI) of the DCI message.

Some examples of the method, apparatuses, or non-transitory computer-readable medium described herein may further include processes, features, means, or instructions for receiving the repetition level in system information signaling. In some examples, the repetition level is determined based on a repetition level for a message 3 Physical Uplink Shared Channel (PUSCH) transmission or a message A PUSCH transmission. In some examples, the repetition level is determined based on a number of Orthogonal Frequency Division Multiplexing (OFDM) symbols of the PUCCH transmission. In some examples, the transmitting the PUCCH transmission comprises performing intra-slot repetition or inter-slot repetition of the PUCCH transmission based on a number of Orthogonal Frequency Division Multiplexing (OFDM) symbols of the PUCCH transmission or a location of a first OFDM symbol of the PUCCH transmission. In some examples, inter-slot repetition is performed if the number of OFDM symbols of the PUCCH transmission is above a threshold and intra-slot repetition is performed if the number OFDM symbols of the PUCCH transmission is below the threshold. In some examples, performing the intra-slot repetition includes transmitting at least one repetition of the PUCCH transmission prior to transmitting the PUCCH transmission on the PUCCH resource.

In some examples, the transmitting the PUCCH transmission comprises determining a type of frequency hopping for the PUCCH transmission, wherein the type of frequency hopping includes intra-slot frequency hopping or inter-slot frequency hopping, and transmitting the PUCCH transmission according to the determined type of frequency hopping. In some examples, the determining the type of frequency hopping includes receiving an indication of the type of frequency hopping to use for the PUCCH transmission. In some examples, the determining the type of frequency hopping comprises selecting intra-slot frequency hopping if a length of each PUCCH repetition is greater than a threshold number of OFDM symbols or inter-slot hopping if the length is less than the threshold number of OFDM symbols. In some examples, the determining the type of frequency hopping is based on a fixed type of frequency hopping specified for the PUCCH transmission.

Some examples of the method, apparatuses, or non-transitory computer-readable medium described herein may further include processes, features, means, or instructions for receiving a set of cyclic shift indexes for applying cyclic shifts to the PUCCH transmission, determining a first cyclic shift to apply to a first repetition of the PUCCH transmission based on a first index of the set of cyclic shift indexes, identifying at least one second cyclic shift to apply to a second repetition of the PUCCH transmission using an index subsequent to the first index in the set of cyclic shift indexes, and applying the first cyclic shift to the first repetition of the PUCCH transmission and the second cyclic shift to the second repetition of the PUCCH transmission.

A method of wireless communication is described. The method may include transmitting, to a user equipment (UE), information scheduling a Physical Uplink Control Channel (PUCCH) transmission on a PUCCH resource prior to configuring dedicated PUCCH resources for the UE, determining a repetition level for the PUCCH transmission, transmitting, to the UE, an indication of the repetition level, and receiving, according to the repetition level, a first repetition of the PUCCH transmission on the PUCCH resource and other repetitions of the PUCCH transmission.

An apparatus for wireless communication is described. The apparatus may include a processor, a memory in electronic communication with the processor, and instructions stored in the memory. The instructions may be executable by the processor to cause the apparatus to transmit, to a user equipment (UE), information scheduling a Physical Uplink Control Channel (PUCCH) transmission on a PUCCH resource prior to configuring dedicated PUCCH resources for the UE, determine a repetition level for the PUCCH transmission, transmit, to the UE, an indication of the repetition level, and receive, according to the repetition level, a first repetition of the PUCCH transmission on the PUCCH resource and other repetitions of the PUCCH transmission.

A non-transitory computer readable medium storing code for wireless communication is described. The code may include instructions executable by a processor to transmit, to a user equipment (UE), information scheduling a Physical Uplink Control Channel (PUCCH) transmission on a PUCCH resource prior to configuring dedicated PUCCH resources for the UE, determine a repetition level for the PUCCH transmission, transmit, to the UE, an indication of the repetition level, and receive, according to the repetition level, a first repetition of the PUCCH transmission on the PUCCH resource and other repetitions of the PUCCH transmission.

Another apparatus for wireless communication is described. The apparatus may include means for transmitting, to a user equipment (UE), information scheduling a Physical Uplink Control Channel (PUCCH) transmission on a PUCCH resource prior to configuring dedicated PUCCH resources for the UE, means for determining a repetition level for the PUCCH transmission, means for transmitting, to the UE, an indication of the repetition level, and means for receiving, according to the repetition level, a first repetition of the PUCCH transmission on the PUCCH resource and other repetitions of the PUCCH transmission.

Some examples of the method, apparatuses, or non-transitory computer-readable medium described herein may further include processes, features, means, or instructions for transmitting a contention resolution message on a Physical Downlink Shared Channel (PDSCH) in a random access procedure. In some examples, the PUCCH transmission includes a Hybrid Acknowledge Repeat Request Acknowledgement (HARCK-ACK) message indicating status of reception of the contention resolution message at the UE. In some examples, the transmitting the indication of the repetition level comprises transmitting the repetition level in a Downlink Control Information (DCI) message for scheduling the contention resolution message. Some examples of the method, apparatuses, or non-transitory computer-readable medium described herein may further include processes, features, means, or instructions for including the repetition level in a Downlink Assignment Indicator (DAI) of the DCI message. In some examples, the transmitting the indication of the repetition level comprises transmitting the repetition level in system information signaling. In some examples, the repetition level is determined based on a repetition level for a message 3 Physical Uplink Shared Channel (PUSCH) transmission or a message A PUSCH transmission.

In some examples, the receiving the PUCCH transmission comprises receiving the PUCCH transmission via intra-slot repetition or inter-slot repetition based on a number of Orthogonal Frequency Division Multiplexing (OFDM) symbols of the PUCCH transmission or a location of a first OFDM symbol of the PUCCH transmission. In some examples, the PUCCH transmission is received via inter-slot repetition if the number of OFDM symbols of the PUCCH transmission is above a threshold and via intra-slot repetition if the number OFDM symbols of the PUCCH transmission is below the threshold. In some examples, receiving the PUCCH transmission via intra-slot repetition includes receiving at least one repetition of the PUCCH transmission prior to receiving the PUCCH transmission on the PUCCH resource set.

In some examples, the receiving the PUCCH transmission comprises receiving the PUCCH transmission via intra-slot frequency hopping or inter-slot frequency hopping. Some examples of the method, apparatuses, or non-transitory computer-readable medium described herein may further include processes, features, means, or instructions for transmitting to the UE an indication of the type of frequency hopping to use for the PUCCH transmission. In some examples, the PUCCH transmission is received via intra-slot frequency hopping if a length of each PUCCH repetition is greater than a threshold number of OFDM symbols and via inter-slot hopping if the length is less than the threshold number of OFDM symbols.

Some examples of the method, apparatuses, or non-transitory computer-readable medium described herein may further include processes, features, means, or instructions for transmitting a set of cyclic shift indexes for applying cyclic shifts to the PUCCH transmission, and receiving a first repetition of the PUCCH transmission having a first cyclic shift based on a first index of the set of cyclic shift indexes and a second repetition of the PUCCH transmission having a second cyclic shift based on an index subsequent to the first index in the set of cyclic shift indexes.

DETAILED DESCRIPTION

Figure 1:
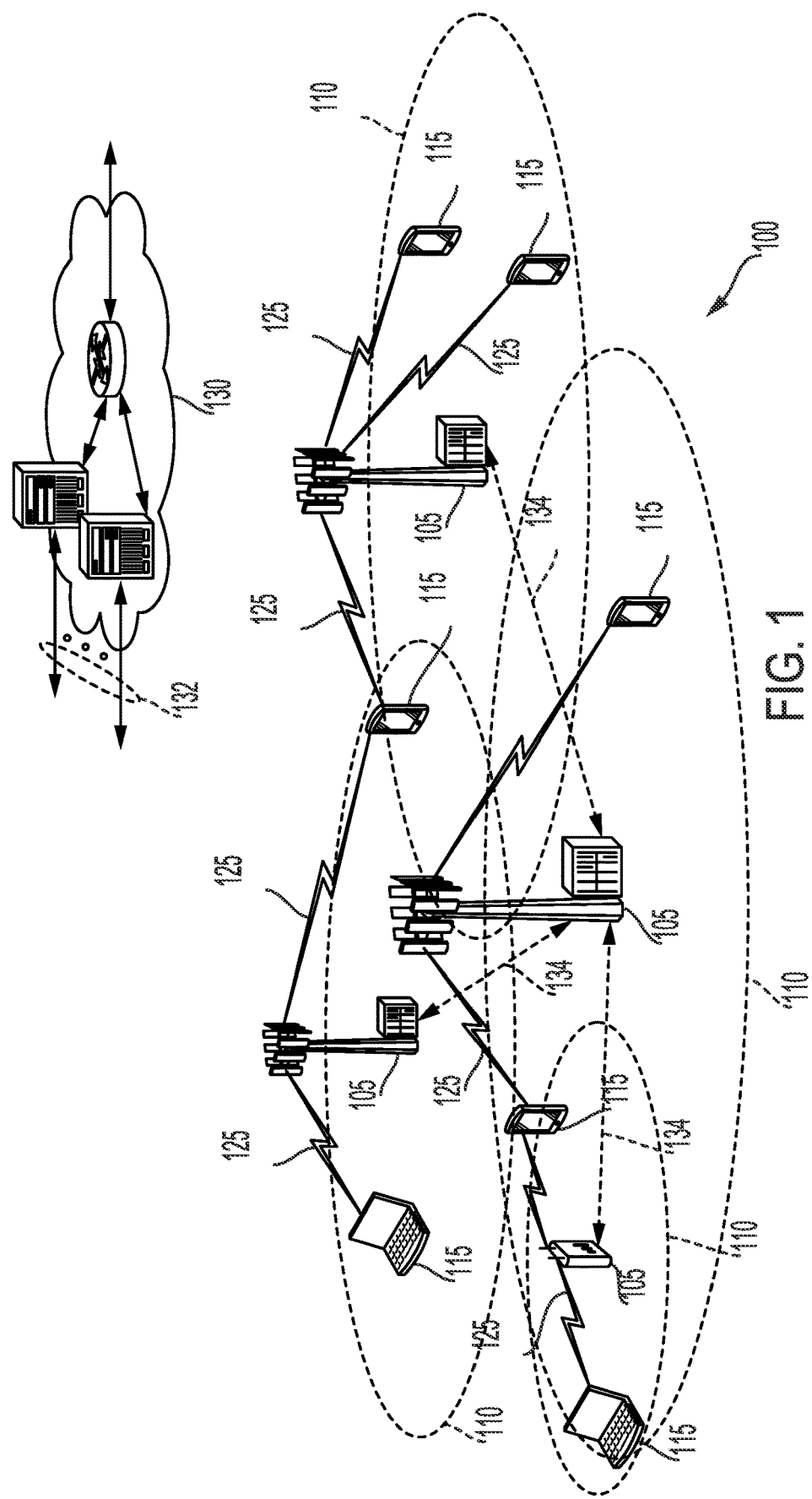
FIG. 1 illustrates an example of a system for wireless communication that supports uplink control repetition enhancements in accordance with aspects of the present disclosure.

In various deployments of wireless communications, including 5G New Radio (NR), for example, a UE may perform random access procedures under certain conditions, including for initial access to a network, when transitioning from an inactive or idle radio resource control (RRC) state to a connected RRC state, when performing handover from one cell to a target cell, or for certain small uplink data transmissions. In some instances, the random access procedure may comprise a four-step random access procedure that involves the UE transmitting a first message (MSG1) comprising a Physical Random Access Channel (PRACH) preamble, receiving a second message (MSG2) comprising a random access response (RAR) that includes scheduling for a Physical Uplink Shared Channel (PUSCH) transmission, transmitting a third message (MSG3) comprising the PUSCH transmission, and receiving a fourth message (MSG4) comprising a contention resolution message on the Physical Downlink Control Channel (PDCCH) or Physical Downlink Shared Channel (PDSCH). In response to receiving the MSG4 transmission, the UE may transmit an acknowledgement message, such as a Hybrid Automatic Repeat Request (HARQ) Acknowledgement (ACK) message, to a base station on the Physical Uplink Control Channel (PUCCH) to indicate whether MSG4 was successfully received. In other instances, the random access procedure may comprise a two-step random access procedure that involves the UE transmitting a first message (MsgA) comprising the PRACH preamble and PUSCH transmission, and then receiving a second message (MsgB) comprising scheduling and/or contention resolution in PDCCH and PDSCH. In response to receiving MsgB, the UE may transmit an acknowledgement message, such as a HARQ-ACK message, to the base station on the PUCCH to indicate whether MsgB was successfully received.

In some deployments, in order to improve coverage and reliability, coverage enhancement techniques are applied to certain transmissions, including PUCCH transmissions. The coverage enhancement techniques may include repetition of a transmission for coverage extension. For certain PUCCH transmissions such as HARQ-ACK transmissions in response to Msg4 or MsgB during random access procedures, however, these coverage enhancement techniques may not be supported. In particular, PUCCH repetitions may be supported when the PUCCH transmission is scheduled using dedicated PUCCH resources (e.g., via a grant on PDCCH), but may not be supported when the PUCCH transmission is scheduled via a PUCCH resource set that is provided via system information (e.g., system information block 1 (SIB1)), as is the case for the HARQ-ACK transmission on PUCCH in response to Msg4 or MsgB (i.e., PUCCH transmission during random access procedures). Such PUCCH transmissions may be referred to as PUCCH transmissions that are configured without dedicated PUCCH resources.

Nonetheless, certain deployments of 5G NR may benefit from coverage enhancement support even for PUCCH transmissions without dedicated PUCCH resources. In some instances, NR-Light category UEs may generally require more coverage enhancement support due to lower transmission power of the NR-Light UEs. For example, NR-Light UEs may have a transmission power a few dB lower than the transmission power of a eMBB/URLLC UE. Further, NR-Light UEs may have a small number of antennas (e.g., a single antenna), which further results in reduced coverage. Coverage enhancement support may be beneficial in these instances, including for PUCCH transmissions during random access procedures. Even for eMBB/URLLC UEs, PUCCH transmissions at high frequency bands (e.g., above 24 GHz bands) may have smaller coverage and could benefit from coverage extension. In yet another example, random access procedures may be used for sending small amounts of uplink data even during RRC Inactive or Idle states. In this scenario, coverage enhancement for PUCCH transmissions without dedicated PUCCH resources may improve reliability of the transmissions.

As described in further detail in the present disclosure, PUCCH repetition may be performed to increase coverage extension during random access procedures. In particular, a UE may perform repetition on a PUCCH transmission that contains a HARQ-ACK feedback for a contention resolution PDSCH transmission in a random access procedure. The PUCCH transmission may be transmitted on resources prior to the UE receiving dedicated PUCCH resources. In some instances, the UE may determine the repetition level for the PUCCH transmission based on a number of factors, including receiving the repetition level in system information signaling, receiving the repetition level in a Downlink Control Information (DCI) message, determining the repetition level based on prior uplink transmission repetition levels, and/or determining the repetition level based on a number of Orthogonal Frequency Division Multiplexing (OFDM) symbols of the PUCCH transmission. The PUCCH transmission repetitions may also incorporate different types of frequency hopping, such as intra-slot or inter-slot frequency hopping, or different patterns of repetition, such as intra-slot repetition or inter-slot repetition, depending on various factors. In certain instances, cyclic shift hopping may also be applied for each repetition of the PUCCH transmission.

Aspects of the disclosure are initially described in the context of a wireless communications system. Aspects of the disclosure are further illustrated by and described with reference to apparatus diagrams, system diagrams, and flowcharts that relate to support for single-code communications. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to enhancements for uplink control repetition. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G NR networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports uplink control repetition enhancements in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP, eNB, gNB, and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), ultra-reliable low-latency communications (URLLC), NR-Light, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, NR-Light device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention or with minimal human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115. For example, a first base station 105 may determine from CSI reports that transmissions from a neighboring base station 105 are negatively interfering with communications between the first base station 105 and the UE 115. Accordingly, the first base station 105 may inform the neighboring base station 105 via backhaul links 134 of the interference or request that the neighboring base station 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. As described herein, HARQ feedback may include transmission of a HARQ-ACK message on PUCCH in response to a contention resolution message (e.g., Msg4 in four-step random access or MsgB in two-step random access). In some instances, the UE may transmit the HARQ-ACK message in this scenario on PUCCH resources prior to configuration of dedicated PUCCH resources for the UE or prior to completion of RRC connection setup.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In 5G NR deployments, a radio frame may have a duration of 10 ms, and one slot may comprise 14 OFDM symbols, but the number of slots in a 5G NR radio frame may vary due to flexible numerology resulting in a flexible time-slot structure. In particular, the numerology for 5G NR may include sub-carrier spacings of 15 kHz, 30 kHz, 60 kHz, or 120 kHz, depending on the system configuration and bandwidth. For example, with increased sub-carrier spacing, the symbol duration decreases while the radio frame duration would remain the same. Accordingly, if the sub-carrier spacing is increased from 15 kHz to 30 kHz, the duration of each slot is halved, resulting in 20 slots within the 10 ms radio frame.

In some wireless communications systems, a slot may further be divided into multiple mini-slots containing one or more symbols and, in some instances, a symbol of a mini-slot or a mini-slot may be the smallest unit of scheduling. In some deployments, such as in 5G NR, each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain, or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz for LTE). In 5G NR, the carrier bandwidth may range from 5 MHz up to 100 MHz for sub-6 GHz frequency spectrum, and from 50 MHz up to 400 MHz for mmW frequency spectrum (above 24 GHz frequency spectrum). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with a particular serving base station 105. In some instances, the UE 115 may initiate a random access procedure via communication link 125 with a base station 105. The random access procedure may be initiated as part of initial access, an RRC state transition from RRC Inactive/Idle states to RRC Connected state, a handover procedure as the UE 115 moves from one base station 105 to a target base station 105, or for small uplink data transmissions in RRC Inactive/Idle states. The random access procedure may include several transmission messages, including HARQ-ACK feedback messages that acknowledge reception of a random access contention resolution message, such as Msg4 or MsgB. The HARQ-ACK feedback message may be transmitted on PUCCH resource sets as indicated by the base station 105 via system information, prior to configuration of dedicated PUCCH resources. In some instances, the UE 115 may comprise a low-cost or low-complexity device, such as an NR-Light device, MTC device, or NB-IoT device. As such, the UE 115 may use coverage enhancement techniques, such as repetition of certain transmissions to extend coverage. PUCCH transmissions prior to configuration of dedicated PUCCH resources, such as transmission of HARQ-ACK messages after a contention resolution message during random access, may typically be transmitted without repetitions. The UE 115 may, however, perform repetition of the PUCCH transmission as described in further detail in the present disclosure in order to improve coverage of the UE's 115 random access transmissions. Further, even UEs 115 that are not considered NR-Light or low-cost devices may perform PUCCH transmission repetition in certain instances. Other procedures and details for supporting uplink control enhancements are described herein.

Figure 2:
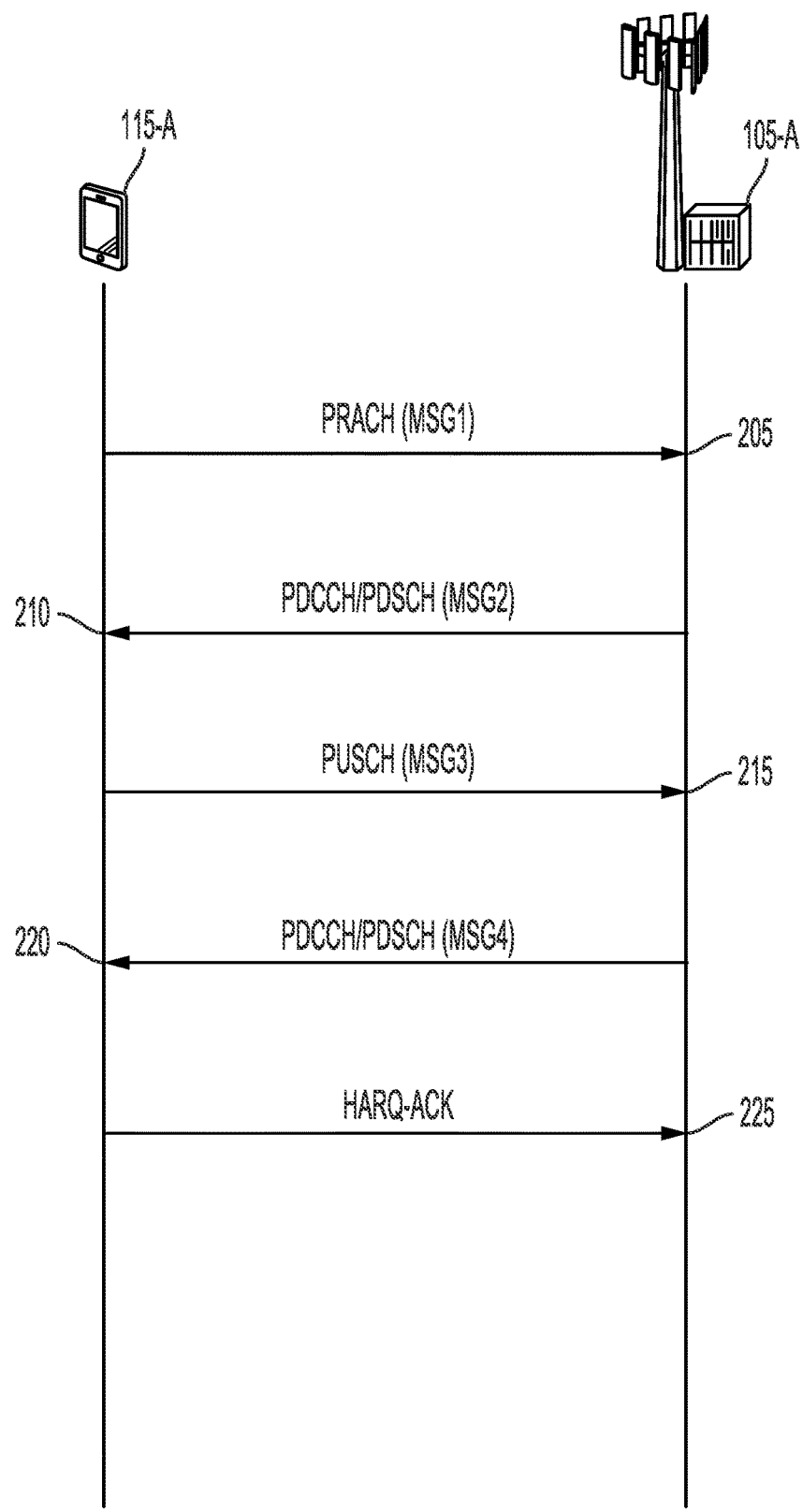
FIG. 2 illustrates an example of a system for wireless communication that supports random access uplink enhancements in accordance with aspects of the present disclosure.

FIG. 2 illustrates an example of a wireless communication system 200 that supports a four-step RACH procedure in accordance with various aspects of the present disclosure. In some examples, wireless communication system 200 may implement aspects of wireless communication system 100. For example, wireless communication system 200 includes UE 115-*a* and base station 105-*a*, which may be examples of the corresponding devices described with reference to FIG. 1. Wireless communication system 200 may support random access procedures for UEs 115-*a* that initiate access to a base station 105-*a*.

As seen in FIG. 2, a typical RACH procedure may involve four transmissions. First, a UE 115-*a* may transmit Msg1 on the PRACH at 205. The Msg1 transmission is a first transmission that may include a PRACH preamble, including timing information for uplink transmissions that allow the base station 105-*a* to set timing advance parameters, for example. In response to receiving Msg1, the base station 105-*a* may transmit a Msg2 transmission on the PDCCH or PDSCH at 210. The Msg2 transmission may also be referred to as a random access response (RAR) message, and the contents may include timing advance parameters or information, an uplink grant for the UE's 115-*a* Msg3 transmission on the uplink, a temporary cell radio network temporary identifier (TC-RNTI), and the like. In some instances, the TC-RNTI may be sent to the UE 115-*a* to indicate the scrambling sequence used for Msg4 transmission.

After receiving Msg2 or the RAR, the UE 115-*a* may then transmit Msg3 on PUSCH at 215 using resources scheduled by the uplink grant of Msg2. In some instances, the contents of Msg3 may include an RRC connection request, a scheduling request, a buffer status of the UE 1150-*a*, or the like. The base station 105-*a* may then transmit a contention resolution message referred to as Msg4 on the PDCCH or PDSCH at 220. The UE 115-*a* then sends a HARQ-ACK message at 225 to acknowledge whether Msg4 was received at the UE 115-*a* or not. The RACH procedure depicted in FIG. 2 may be performed in various use cases, including for initial access to a network or cell, when a UE 115-*a* transitions from an RRC Idle/Inactive state to an RRC Connected state (e.g., after receiving a paging message), or when a UE 115-*a* is changing serving base stations 105-*a* during a handover procedure. Further, in some instances, a UE 115-*a* may use the RACH procedure described above to send small uplink data transmissions during RRC Idle/Inactive states in order to save on the overhead costs of leaving RRC Idle/Inactive states into RRC Connected state just to transmit a relatively small amount of data.

Figure 3:
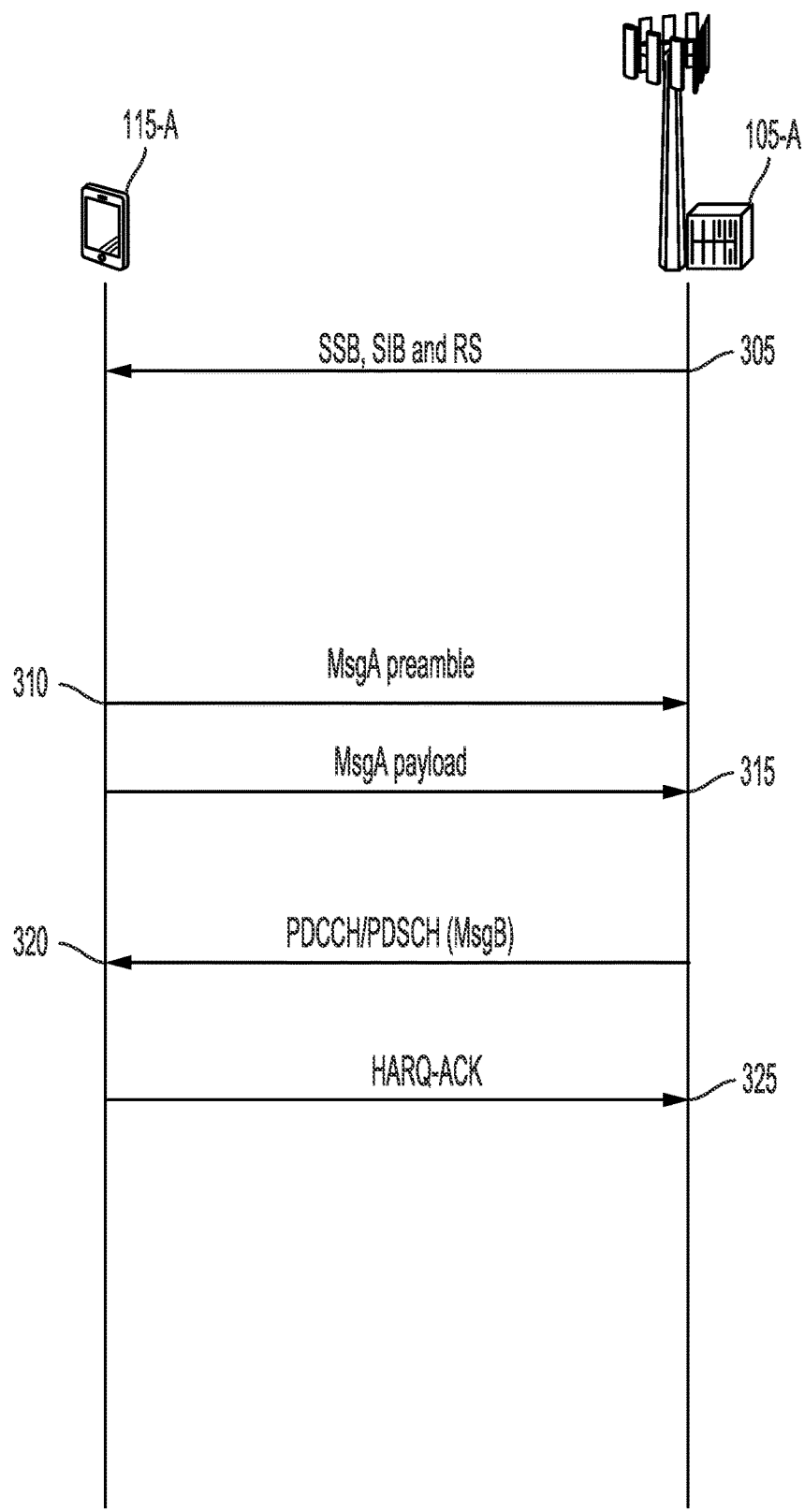
FIG. 3 illustrates an example of a system for wireless communication that supports random access uplink enhancements in accordance with aspects of the present disclosure.

FIG. 3 illustrates an example of a wireless communication system 300 that supports a two-step RACH procedure in accordance with various aspects of the present disclosure. In some examples, wireless communication system 300 may implement aspects of wireless communication system 100. For example, wireless communication system 300 includes UE 115-*a* and base station 105-*a*, which may be examples of the corresponding devices described with reference to FIG. 1. Wireless communication system 300 may support random access procedures for UEs 115-*a* that initiate access to a base station 105-*a*.

As seen in FIG. 3, a base station 105-*a* may transmit broadcast information to multiple UEs in a synchronization signal PBCH block (SS/PBCH block) at 305. The UE 115-*a* may receive and decode the SS/PBCH block to obtain system information, perform synchronization procedures, and measure channel conditions based on reference signals received in the PBCH block. Based on the information obtained from the SS/PBCH block, the UE 115-*a* may then initiate a two-step random access procedure by transmitting a first random access message MsgA to the base station 105-*a* at 310 and 315. The random access message MsgA may be transmitted on both the PRACH and PUSCH, and may carry information similar to Msg1 and Msg3 of the four-step random access procedure described above with reference to FIG. 2. For example, MsgA may include the random access preamble 310 on the PRACH as well as a random access payload 315 that includes a RRC connection request, a scheduling request, buffer status, and the like, on the PUSCH. In response, the base station 105-*a* may transmit a random access response in MsgB at 320. MsgB may include timing advance information as well as a contention resolution message. In response to MsgB, the contention resolution message, the UE 115-a may send a HARQ-ACK message at 325 to acknowledge successful reception of MsgB.

For both the four-step RACH procedure described above with respect to FIG. 2 and the two-step RACH procedures described above with respect to FIG. 3, the HARQ-ACK message acknowledging the contention resolution message (Msg4 or MsgB) may be transmitted prior to the UE 115 receiving dedicated PUCCH resource configuration. In particular, the UE 115 may transmit the HARQ-ACK message on PUCCH resources that are assigned via indication in system information (e.g., SIB1). For example, the base station 105 may transmit an index in SIB1 (e.g., remaining minimum system information (RMSI)) that specifies which resources to use for the PUCCH transmission that includes the HARQ-ACK message based on a table known to the UE 115 and the base station 105. The index provided by the base station 105-a may correspond to a particular row in a table, where the UE 115 can obtain the necessary information for identifying a set of PUCCH resources that could be used for transmitting the HARQ-ACK message. As shown in Table 1, for example, if the base station 105 indicates to the UE 115 an index of 6 to use for PUCCH resource assignment, the UE 115 determines that a PUCCH transmission will comprise PUCCH format 1, will be transmitted on symbol 10 of the uplink slot, will comprise four symbols in length, and will have a PRB offset starting at four. As also determined from Table 1, the PUCCH transmission may have a cyclic shift based on a set of potential set of cyclic shift indexes comprising {0, 3, 6, 9}.

TABLE 1

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

As described above, repetitions for PUCCH transmissions scheduled using dedicated PUCCH resources may typically be supported, while for PUCCH transmissions scheduled prior to configuration of dedicated PUCCH resources, repetition may not be supported. Examples of PUCCH transmissions that may occur without or prior to configuration of dedicated PUCCH resources may include HARQ-ACK messages in response to Msg4 or MsgB reception during random access procedures. Certain wireless communication deployments, however, may require further coverage enhancements. For example, later deployments of NR may include NR-Light UEs 115, which may be considered mid-tier or low-tier UEs 115. Examples of NR-Light UEs 115 may include wearables, industrial sensors, video monitoring devices, relaxed IT devices, and the like. Some NR-Light UEs 115 may support smaller bandwidth capabilities (e.g., 10 MHz) than regular UEs (e.g., 100 MHz or larger). NR-Light UEs 115 may comprise lower cost or lower power UEs relative to eMBB or URLLC UEs. For example, the transmission power of NR-Light UEs may be several dB lower than the transmission power of eMBB/URLLC UEs 115, while the number of transmission antennas of NR-Light UEs 115 may be smaller (e.g., a single antenna). As such, NR-Light UEs 115 may have much smaller coverage compared to that of eMBB/URLLC UEs. Further, even eMBB/URLLC UEs may have reduced coverage in high frequency bands, such as frequency bands above 24 GHz. Accordingly, PUCCH repetition for HARQ-ACK messages prior to configuration of dedicated PUCCH resources may provide coverage enhancement benefits to a variety of applications, including NR-Light UEs and other UEs operating in high frequency bands.

As described in the present disclosure, a UE 115 may apply repetition to PUCCH transmissions that do not have dedicated PUCCH resources configured. For example, in response to receiving Msg4 or MsgB during random access procedures, the UE 115 may transmit HARQ-ACK messages using a particular repetition level or factor on PUCCH resources prior to receiving configuration of dedicated PUCCH resources. In some instances, the base station 105 may signal the repetition level that the UE 115 should use to the UE 115. The base station 105 may determine the appropriate repetition level that the UE 115 should use based on power measurements of prior transmissions received from the UE 115, such as the RACH preamble transmission, Msg3, or MsgA, and then transmit an indication of the repetition level to the UE 115 using various options.

In one option, the base station 105 may transmit the repetition level using system information, such as via SIB1, SIB2, or through RRC signaling. In this situation, the base station 105 may broadcast the repetition level such that multiple UEs 115 served by the base station 105 within the same cell may use the repetition level for HARQ-ACK transmissions. Alternatively, or additionally or in combination with the above, the base station 105 may signal the repetition level to the UE 115 using dynamic scheduling via the DCI message that scheduled a prior random access contention resolution transmission, such as Msg4 or MsgB. For example, the base station 105 may schedule Msg4 transmission using DCI format 1_0 with a cyclic redundancy check (CRC) scrambled using a temporary cell radio network temporary identifier (TC-RNTI), and the UE 115 may determine the uplink resources to use for Msg4 transmission based on the received grant. In some instances, within the DCI having format 1_0, there may be a downlink assignment indicator (DAI) portion that is typically used for HARQ codebook size determination. However, the HARQ-ACK transmission in response to reception of Msg4 or MsgB comprises only 1 bit. Accordingly, the DAI portion that would typically be used for HARQ codebook size determination is not needed for HARQ-ACK transmission in response to reception of Msg4 or MsgB. Instead, those bits within the DAI that may then be used to dynamically indicate the repetition level to the UE 115. In particular, if the possible repetition levels for a UE 115 are 1, 2, 4, and 8, two DAI bits would need to be used to indicate the particular repetition level. If the base station 105 uses DCI to indicate the repetition level, the indication may be UE-specific, in contrast to the use of system information to convey the repetition level. In still another implementation, or additionally or in combination with any of the above, the UE 115 may determine the repetition level to use for transmitting the HARQ-ACK message based on a repetition level of a prior transmission. For example, the UE 115 may use the same repetition level for HARQ-ACK transmission on PUCCH as that used for transmission of Msg3 or MsgA on PUSCH.

In some instances, the UE 115 may perform PUCCH repetition under certain circumstances or if certain conditions are met. For example, the UE 115 may perform PUCCH repetition when the number N of Orthogonal Frequency Division Multiplexing (OFDM) symbols of the scheduled PUCCH transmission is greater than a particular threshold (e.g., N>2, N>7, or N>=10). If the number N of OFDM symbols of the scheduled PUCCH transmission is less than the particular threshold, the UE 115 may determine not to perform PUCCH repetition. In this situation, the base station 105 may schedule the UE 115 for longer PUCCH transmissions (with N greater than the threshold) if the base station 105 determines that the UE 115 is operating under poor channel conditions and requires more coverage enhancement. The longer PUCCH transmissions may then trigger the UE 115 to perform repetitions for PUCCH transmission based on a determined repetition level in accordance with the options described herein.

As used herein in the present disclosure, the repetition level or factor used by the UE 115 to enhance PUCCH transmissions may refer to a value equal to a number of times to repeat the PUCCH transmission or a level mapped to predefined numbers of repetitions. For example, the repetition level may comprise a value of four, indicating the UE 115 should repeat a transmission four times. In other instances, the repetition level may indicate a predefined number of repetitions per level.

Figure 4:
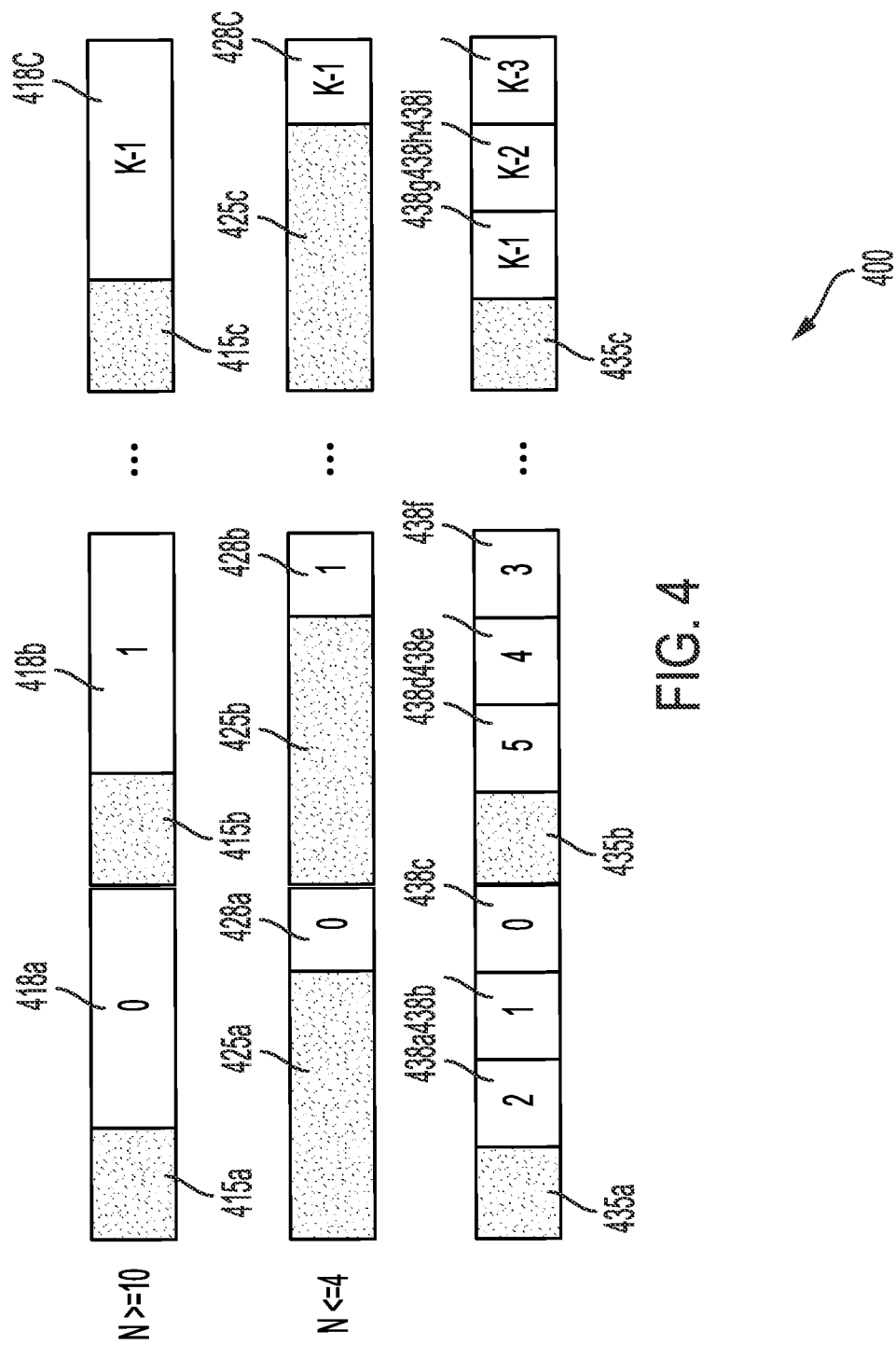
FIG. 4 illustrates an example slot structure depicting repetition patterns for uplink control repetition enhancements in accordance with various aspects of the present disclosure.

FIG. 4 illustrates an example depiction 400 of possible PUCCH repetition patterns. As shown in the illustrated example, a UE 115 may perform PUCCH repetition either using inter-slot repetition or intra-slot repetition. In some instances, the repetition pattern may be based at least in part on the number N of OFDM symbols allotted for the PUCCH transmission, as determined based on the index received from the base station 105 indicating the PUCCH resources to use from Table 1. Turning to FIG. 4, for example, if the UE 115 receives indication (i.e., an index of a row in Table 1) that the initial PUCCH transmission is configured for 10 or more OFDM symbols, the UE 115 may perform inter-slot repetition, or repetitions of PUCCH across different slots. In the illustrated example, the initial PUCCH transmission 418a may be scheduled for a first slot 415a, and the UE 115 may then transmit subsequent repetitions 418b, 418c, etc. of the PUCCH transmission 418a in subsequent slots 415b, 415c, etc. With inter-slot repetition, each slot may include one repetition.

If the UE 115 receives indication that the PUCCH transmission is configured for 4 or fewer OFDM symbols, the UE 115 could perform inter-slot repetition as depicted in slots 425a, 425b, and 425c. In this instance, however, there would be relatively large latency between repetitions 428a, 428b, and 428c due to the smaller size of the PUCCH transmission. Accordingly, the UE 115 may instead perform intra-slot repetition in this situation, as shown in slots 435a, 435b, and 435c. Here, the UE 115 may transmit multiple repetitions of the initial scheduled PUCCH transmission within the same slot. For example, for initial scheduled PUCCH transmission 438c, the UE 115 may transmit repetitions 438a and 438b in the same slot 435a, and similarly for repetitions 438d and 438e of PUCCH transmission 438f in slot 435b, and repetitions 438g and 438h of PUCCH transmission 438i in slot 435c. Further, as depicted in FIG. 4, the UE 115 may transmit repetitions of a scheduled PUCCH transmission in symbols that occur prior to the symbols scheduled for the initial PUCCH transmission. In FIG. 4, the UE 115 may determine that a scheduled PUCCH transmission 438c is to occur in slot 435a on particular resources at the end of the slot duration. Since the PUCCH transmission 438c occurs at the end of the slot 435a, and since the UE 115 has identified intra-slot is to be performed, the UE 115 may transmit repetitions 438a and 438b on resources prior to the initially scheduled PUCCH transmission 438c.

Figure 5:
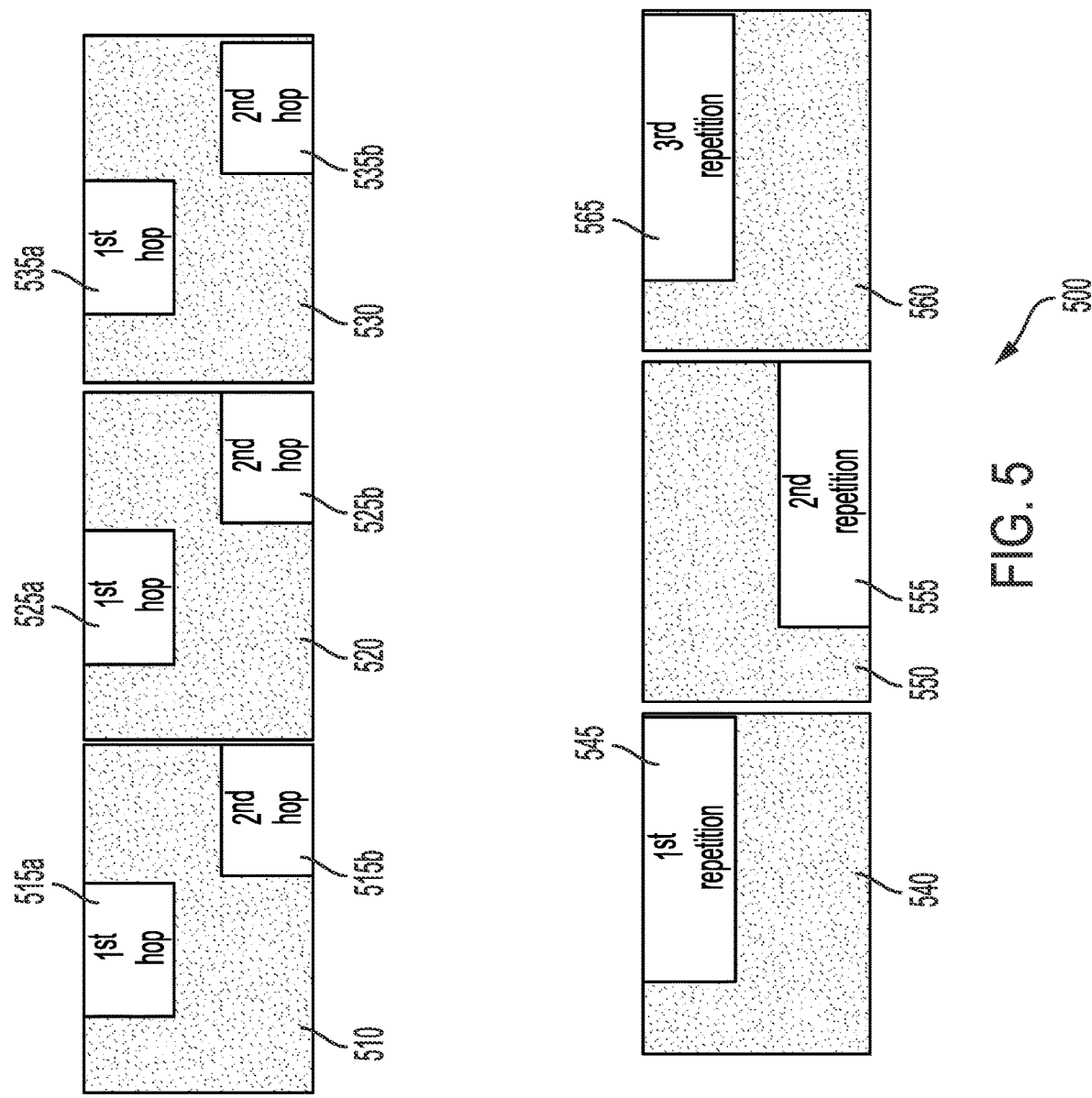
FIG. 5 illustrates an example slot structure depicting frequency hopping patterns for uplink control repetition enhancements in accordance with various aspects of the present disclosure.

In some instances, when the UE 115 transmits HARQ-ACK prior to receiving configuration with dedicated PUCCH resources, the UE 115 may apply frequency hopping to the PUCCH transmission. FIG. 5 illustrates an example depiction 500 of possible frequency hopping patterns when applied to PUCCH repetitions. As seen in FIG. 5, the UE 115 may transmit PUCCH repetitions in slots 510, 520 and 530. For intra-slot hopping, the UE 115 may transmit a first portion of the PUCCH transmission in slot 510 using resources in a first frequency range 515a and a second portion in the same slot 510 using resources in a second frequency range 515b, and similarly for slots 520 and 530. For inter slot frequency hopping, the UE 115 may transmit PUCCH repetitions in slots 540, 550, and 560. Here, the UE 115 may transmit the PUCCH transmission in slot 540 on resources in the same frequency range 545. For the following slot 550, however, the UE 115 may transmit the PUCCH transmission on resources in a different frequency range 555. In the third slot 560, the UE 115 may revert to the same frequency range as in slot 540 for transmitting the PUCCH transmission at frequency range 565.

The UE 115 may use intra-slot frequency hopping or inter-slot frequency hopping for PUCCH repetitions, depending on various factors. For example, in some instances, the base station 105 may transmit an indication of whether to perform intra-slot frequency hopping or inter-slot frequency hopping (e.g., via SIB). In certain instances, the UE 115 may determine whether to perform intra-slot frequency hopping or inter-slot frequency hopping for PUCCH transmissions based on the length of each PUCCH repetition. For example, the UE 115 may perform intra-slot hopping if the length of each PUCCH repetition is greater than a threshold number of OFDM symbols (e.g., four OFDM symbols), but may perform inter-slot hopping if the length of each PUCCH repetition is less than the threshold number of OFDM symbols. Alternatively, the UE 115 may determine the type of frequency hopping based on a fixed type of frequency hopping specified for the PUCCH transmission. For example, the UE 115 may perform one of the two types of frequency hopping—inter-slot hopping or intra-slot hopping—by default or as specified by a wireless technical standards specification (e.g., NR standards).

In some instances, the UE 115 may also apply different cyclic shifts to different repetitions of the PUCCH transmission. For a PUCCH transmission configured using an index from Table 1, the UE 115 may identify a set of possible cyclic shifts to apply to the PUCCH transmission. For example, if the UE 115 receives, from the base station 105, an index of 4 in SIB1 to determine the PUCCH resources from Table 1, the UE 115 may determine that the set of possible cyclic shifts that are valid for that PUCCH transmission is {0, 3, 6, 9}. From the set of {0, 3, 6, 9}, the UE 115 may then determine one option from the set of valid cyclic shifts to apply to the PUCCH transmission. For repetitions of the PUCCH transmission, however, the UE 115 may apply cyclic shift hopping based on the same set of {0, 3, 6, 9} indicated by the base station 105. In some instances, the UE 115 may move to the next option in the set of valid cyclic shifts, and so on for each repetition. For example, in the current example of the set of {0, 3, 6, 9} valid cyclic shifts for PUCCH transmission, if the first option from the set is cyclic shift of 3, the UE 115 would transmit a first repetition of PUCCH transmission using the cyclic shift of 3, and then follow the pattern for subsequent repetitions. Here, the second repetition of PUCCH would use cyclic shift of 6, the third repetition of PUCCH would use cyclic shift of 9, and the fourth repetition of PUCCH would use cyclic shift of 0. Additional repetitions of PUCCH would continue with the sequence of cyclic shifts based on the same pattern.

Figure 6:
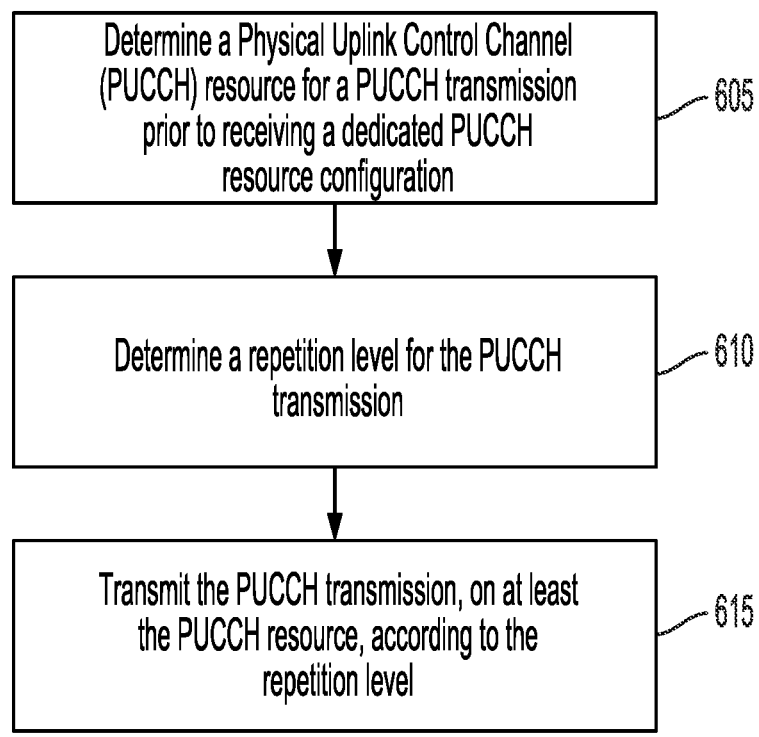
FIGS. 6-7 illustrate example methods for uplink control repetition enhancements in accordance with aspects of the present disclosure.

FIG. 6 shows a flowchart illustrating a method 600 for uplink control enhancements in wireless communications in accordance with aspects of the present disclosure. The operations of method 600 may be implemented by a UE 115 or its components as described herein. For example, the operations of method 600 may be performed by a communications manager as described with reference to FIG. 9. In some examples, a UE 115 may execute a set of codes to control the functional elements of the device to perform the functions described below. Additionally or alternatively, the UE 115 may perform aspects of the functions described below using special-purpose hardware.

At 605, the UE 115 may determine a Physical Uplink Control Channel (PUCCH) resource for a PUCCH transmission prior to receiving a dedicated PUCCH resource configuration. The PUCCH transmission may contain a Hybrid Acknowledge Repeat Request Acknowledgement (HARCK-ACK) message in response to receiving a contention resolution message (e.g., Msg4 or MsgB) on a Physical Downlink Shared Channel (PDSCH) in a random access procedure. At 610, the UE 115 may determine a repetition level for the PUCCH transmission. In some instances, the UE 115 may receive the repetition level in a Downlink Control Information (DCI) message that schedules the contention resolution message, and in certain situations, the repetition level is indicated in a Downlink Assignment Indicator (DAI) of the DCI message. In other instances, the UE 115 may receive the repetition level in system information signaling. Alternatively, or in addition or in combination, the UE 115 may determine the repetition level based on a repetition level of a prior transmission, such as a message 3 Physical Uplink Shared Channel (PUSCH) transmission or a message A PUSCH transmission of the random access procedure. In some instances, the UE 115 may determine the repetition level based on a number of Orthogonal Frequency Division Multiplexing (OFDM) symbols of the PUCCH transmission. For example, the UE 115 may perform PUCCH repetition if the number of OFDM symbols in the indicated PUCCH resource is above a threshold, and may not perform PUCCH repetition if the number of OFDM symbols in the indicated PUCCH resource is below the threshold.

At 615, the UE 115 may transmit the PUCCH transmission, on at least the PUCCH resource, according to the repetition level. In some instances, transmitting the PUCCH transmission comprises performing intra-slot repetition or inter-slot repetition of the PUCCH transmission based on a number of Orthogonal Frequency Division Multiplexing (OFDM) symbols of the PUCCH transmission or a location of a first OFDM symbol of the PUCCH transmission. In certain cases, inter-slot repetition is performed if the number of OFDM symbols of the PUCCH transmission is above a threshold and intra-slot repetition is performed if the number OFDM symbols of the PUCCH transmission is below the threshold. In some cases, performing the intra-slot repetition includes transmitting at least one repetition of the PUCCH transmission prior to transmitting the PUCCH transmission on the PUCCH resource. In certain instances, transmitting the PUCCH transmission comprises determining a type of frequency hopping for the PUCCH transmission, wherein the type of frequency hopping includes intra-slot frequency hopping or inter-slot frequency hopping and transmitting the PUCCH transmission according to the determined type of frequency hopping. In some instances, determining the type of frequency hopping includes receiving an indication of the type of frequency hopping to use for the PUCCH transmission, while in some cases, determining the type of frequency hopping comprises selecting intra-slot frequency hopping if a length of each PUCCH repetition is greater than a threshold number of OFDM symbols or inter-slot hopping if the length is less than the threshold number of OFDM symbols. In some instances, determining the type of frequency hopping is based on a fixed type of frequency hopping specified for the PUCCH transmission.

In some instances, the UE 115 may perform cyclic shift hopping to the PUCCH repetitions. In this case, for applying cyclic shift hopping to the PUCCH repetitions, the UE 115 may also further receive a set of cyclic shift indexes for applying cyclic shifts to the PUCCH transmission, determine a first cyclic shift to apply to a first repetition of the PUCCH transmission based on a first index of the set of cyclic shift indexes, identify at least one second cyclic shift to apply to a second repetition of the PUCCH transmission using an index subsequent to the first index in the set of cyclic shift indexes, and apply the first cyclic shift to the first repetition of the PUCCH transmission and the second cyclic shift to the second repetition of the PUCCH transmission.

Figure 7:
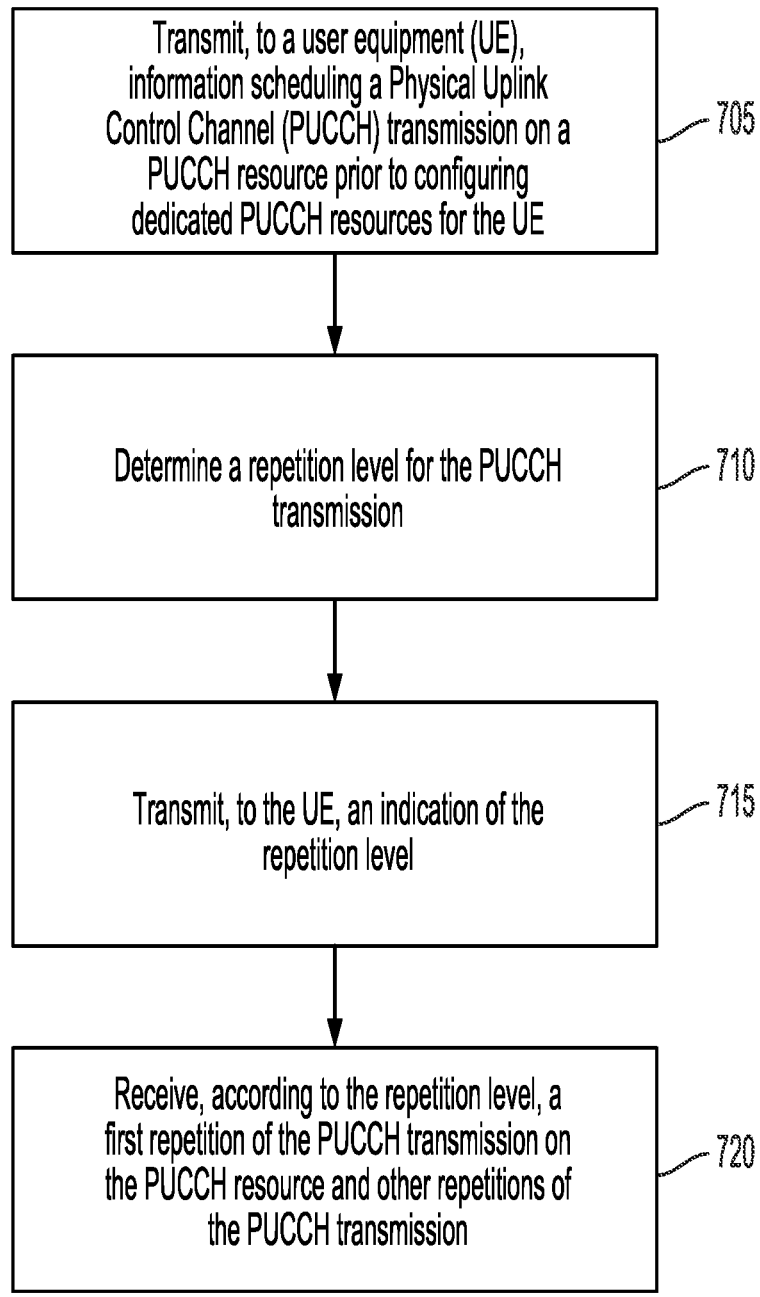

FIG. 7 shows a flowchart illustrating a method 700 for uplink control enhancements in wireless communications in accordance with aspects of the present disclosure. The operations of method 700 may be implemented by a base station 105 or its components as described herein. For example, the operations of method 700 may be performed by a communications manager as described with reference to FIG. 10. In some examples, a base station 105 may execute a set of codes to control the functional elements of the device to perform the functions described below. Additionally or alternatively, the base station 105 may perform aspects of the functions described below using special-purpose hardware.

At 705, the base station 105 transmits, to a user equipment (UE), information scheduling a PUCCH transmission on a PUCCH resource prior to configuring dedicated PUCCH resources for the UE 115. In some instances, the base station 105 also transmits a contention resolution message on a Physical Downlink Shared Channel (PDSCH) in a random access procedure, and the scheduled PUCCH transmission may contain a Hybrid Acknowledge Repeat Request Acknowledgement (HARCK-ACK) message indicating status of reception of the contention resolution message at the UE 115. At 710, the base station 105 may determine a repetition level for the PUCCH transmission.

At 715, the base station 105 may transmit, to the UE 115, an indication of the repetition level. In some instances, the transmitting the indication of the repetition level comprises transmitting the repetition level in a Downlink Control Information (DCI) message for scheduling the contention resolution message. In particular, the base station 105 may include the repetition level in a Downlink Assignment Indicator (DAI) of the DCI message. In some instances, the base station 105 may transmit the indication of the repetition level in system information signaling. In some instances, the repetition level is determined based on a repetition level for prior transmission, such as a message 3 Physical Uplink Shared Channel (PUSCH) transmission or a message A PUSCH transmission in the random access procedure.

At 720, the base station 105 may receive, according to the repetition level, a first repetition of the PUCCH transmission on the PUCCH resource as well as other repetitions of the PUCCH transmission. In some instances, the base station 105 may receive the PUCCH transmission via intra-slot repetition or inter-slot repetition based on a number of Orthogonal Frequency Division Multiplexing (OFDM) symbols of the PUCCH transmission or a location of a first OFDM symbol of the PUCCH transmission. In certain situations, the base station 105 may receive the PUCCH transmission via inter-slot repetition if the number of OFDM symbols of the PUCCH transmission is above a threshold and via intra-slot repetition if the number OFDM symbols of the PUCCH transmission is below the threshold. If the base station 105 receives the PUCCH transmission via intra-slot repetition, the base station 105 may receive at least one repetition of the PUCCH transmission prior to receiving the PUCCH transmission on the PUCCH resource set.

Although not explicitly illustrated in FIG. 7, the base station 105 may perform additional operations that are within the scope of the present disclosure. For example, the base station 105 may receive the PUCCH transmission via intra-slot frequency hopping or inter-slot frequency hopping. In some instances, the base station 105 may transmit to the UE an indication of the type of frequency hopping to use for the PUCCH transmission. In certain cases, the base station 105 may receive the PUCCH transmission via intra-slot frequency hopping if a length of each PUCCH repetition is greater than a threshold number of OFDM symbols and via inter-slot hopping if the length is less than the threshold number of OFDM symbols. In certain instances, to facilitate cyclic shift hopping, for example, the base station may further transmit a set of cyclic shift indexes for applying cyclic shifts to the PUCCH transmission and receive a first repetition of the PUCCH transmission having a first cyclic shift based on a first index of the set of cyclic shift indexes and a second repetition of the PUCCH transmission having a second cyclic shift based on an index subsequent to the first index in the set of cyclic shift indexes.

Figure 8:
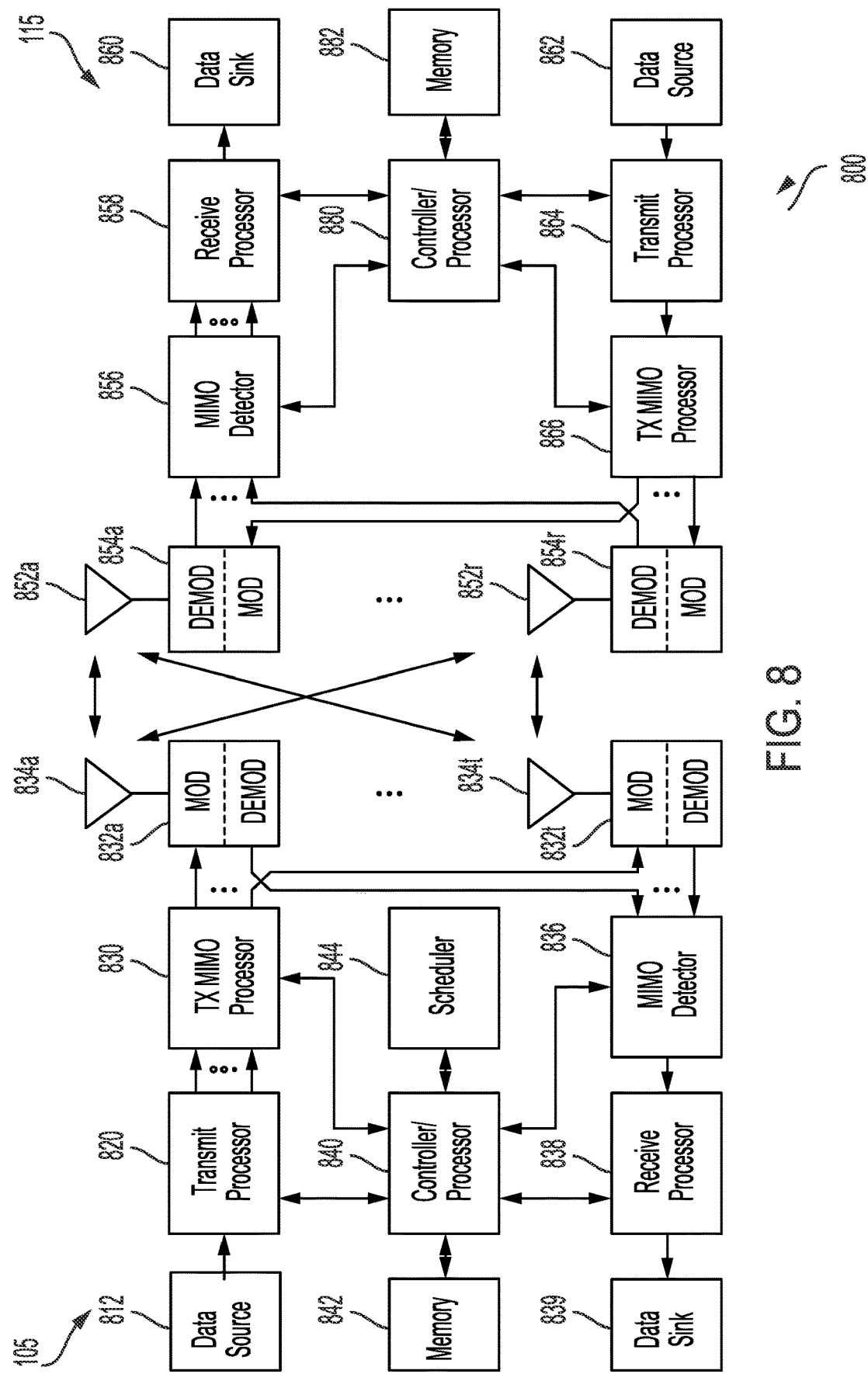
FIG. 8 is a block diagram illustrating a design of a base station/gNB/TRP and a UE configured according to one aspect of the present disclosure.

FIG. 8 shows a block diagram 800 of a design of a base station/eNB/gNB 105 and a UE 115, which may be one of the base stations/eNBs/gNBs and one of the UEs in FIG. 1. At the eNB 105, a transmit processor 820 may receive data from a data source 812 and control information from a controller/processor 840. The control information may be for various control channels such as the PBCH, PCFICH, PHICH, PDCCH, EPDCCH, MPDCCH etc. The data may be for the PDSCH, etc. The transmit processor 820 may process (e.g., encode and symbol map) the data and control information to obtain data symbols and control symbols, respectively. The transmit processor 820 may also generate reference symbols, e.g., for the PSS, SSS, and cell-specific reference signal. A transmit (TX) multiple-input multiple-output (MIMO) processor 830 may perform spatial processing (e.g., precoding) on the data symbols, the control symbols, and/or the reference symbols, if applicable, and may provide output symbol streams to the modulators (MODs) 832a through 832t. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. Downlink signals from modulators 832a through 832t may be transmitted via the antennas 834a through 834t, respectively. The downlink signals may include random access procedure messages, such as Msg2 random access response messages on PDCCH or PDSCH, or Msg4 or MsgB contention resolution messages on PDCCH or PDSCH. The downlink signals may also include a transmission of information for scheduling a PUCCH transmission, such as HARQ-ACK message in response to reception of Msg4 or MsgB contention resolution messages, on a PUCCH resource prior to configuration of dedicated PUCCH resources for the UE 115. An example of the information for scheduling the PUCCH transmission may include an index in SIB1 that corresponds to resources in a predefined table, such as Table 1 above, for the UE 115 to determine the scheduled PUCCH resources for the HARQ-ACK message. The downlink signals may also include indication of a repetition level for the UE 115 to apply a number of repetitions to PUCCH transmissions prior to configuration of dedicated PUCCH resources, as described above with reference to FIGS. 2-7.

At the UE 115, the antennas 852a through 852r may receive the downlink signals from the eNB 105 and may provide received signals to the demodulators (DEMODs) 854a through 854r, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854a through 854r, perform MIMO detection on the received symbols if applicable, and provide detected symbols. A receive processor 858 may process (e.g., demodulate, deinterleave, and decode) the detected symbols, provide decoded data for the UE 115 to a data sink 860, and provide decoded control information to a controller/processor 880.

On the uplink, at the UE 115, a transmit processor 864 may receive and process data (e.g., for the PUSCH) from a data source 862 and control information (e.g., for the PUCCH) from the controller/processor 880. The transmit processor 864 may also generate reference symbols for a reference signal. The symbols from the transmit processor 864 may be precoded by a TX MIMO processor 866 if applicable, further processed by the modulators 854a through 854r (e.g., for SC-FDM, etc.), and transmitted to the eNB 105. The transmissions to the eNB 105 may include random access messages, such as a Msg1 or MsgA PRACH preamble message or Msg3 PUSCH transmissions, for example. The transmissions to the eNB 105 may also include HARQ-ACK messages on PUCCH resources prior to configuration of dedicated PUCCH resources. At the eNB 105, the uplink signals from the UE 115 may be received by the antennas 834, processed by the demodulators 832, detected by a MIMO detector 836 if applicable, and further processed by a receive processor 838 to obtain decoded data and control information sent by the UE 115. The processor 838 may provide the decoded data to a data sink 839 and the decoded control information to the controller/processor 840.

The controllers/processors 840 and 880 may direct the operation at the eNB 105 and the UE 115, respectively. The controller/processor 840 and/or other processors and modules at the eNB 105 may perform or direct the execution of the functional blocks illustrated in FIG. 7, and/or other various processes for the techniques described herein. The controllers/processor 880 and/or other processors and modules at the UE 115 may also perform or direct the execution of the functional blocks illustrated in FIG. 6, and/or other processes for the techniques described herein. The memories 842 and 882 may store data and program codes for the eNB 105 and the UE 115, respectively. For example, memory 842 may store instructions that, when performed by the processor 840 or other processors depicted in FIG. 8, cause the base station 105 to perform operations described with respect to FIG. 7. Similarly, memory 882 may store instructions that, when performed by processor 880 or other processors depicted in FIG. 8 cause the UE 115 to perform operations described with respect to FIG. 6. A scheduler 844 may schedule UEs for data transmission on the downlink and/or uplink.

While blocks in FIG. 8 are illustrated as distinct components, the functions described above with respect to the blocks may be implemented in a single hardware, software, firmware, or combination component or in various combinations of components. For example, the functions described with respect to the transmit processor 820, the receive processor 838, or the TX MIMO processor 830 may be performed by or under the control of processor 840.

Figure 9:
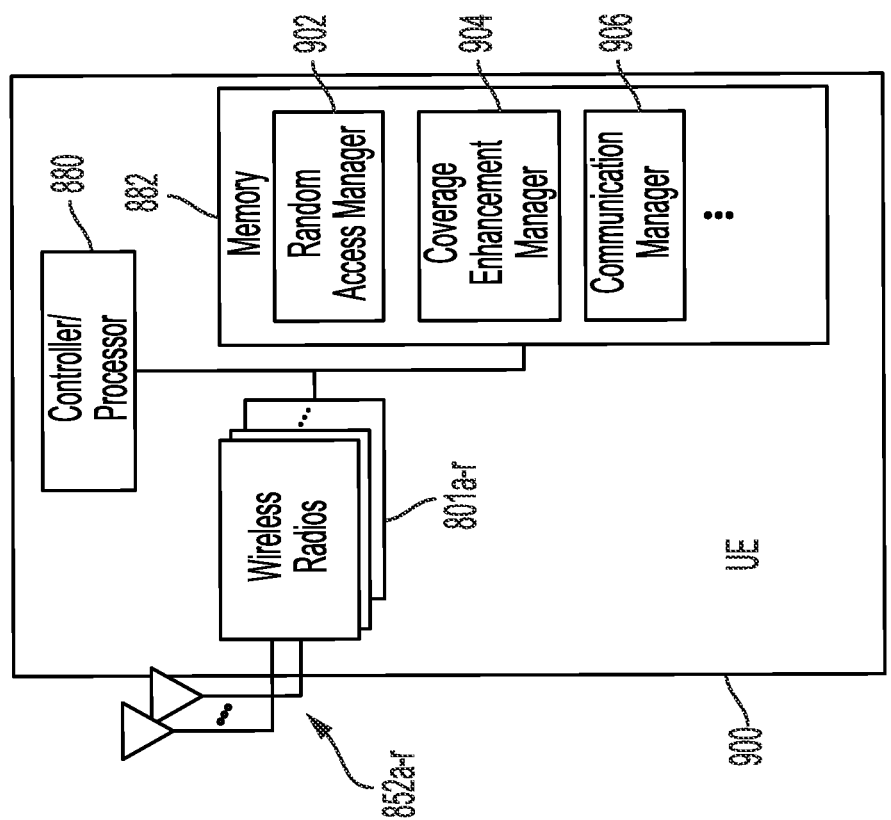
FIG. 9 is a block diagram illustrating a UE configured according to some embodiments of the present disclosure.

Turning now to FIG. 9, a UE 900, such as a UE 115 (see FIG. 8), may have a controller/processor 880, a memory 882, and antennas 852a through 852r, as described above with respect to FIG. 8. UE 900 may also have wireless radios 801a to 801r that comprise additional components also described above with reference to FIG. 8. The memory 882 of UE 900 stores one or more algorithms that configure processor/controller 880 to carry out one or more procedures including, for example, those described above with reference to FIG. 6.

One or more algorithms stored by memory 882 configure processor/controller 880 to carry out one or more procedures relating to wireless communication by the UE 900, as previously described. For example, a random access manager 902 may configure controller/processor 880 to perform operations that include coordinating random access procedures and generating or receiving random access messages, as described above with reference to FIG. 2 and FIG. 3, for transmission and reception using wireless radios 801a-r and antennas 852a-r. The random access messages may include contention resolution messages (e.g., MsgA or Msg4) and HARQ-ACK transmissions, in response to reception of the contention resolution messages, transmitted by UE 900 to gNB 1000. A coverage enhancement manager 904 may configure controller/processor 880 to determine a PUCCH resource for a PUCCH transmission prior to receiving a dedicated PUCCH resource configuration and determine a repetition level for the PUCCH transmission. Also, a communication manager 906 may configure controller/processor 880 to carry out operations including communicating, via wireless radios 801a to 801r, on a control or shared channel, the PUCCH transmission according to the repetition level. Other operations as described above may be carried out by one or more of the described algorithms or components 902, 904, 906 and/or their various subcomponents.

Each of the illustrated components 902, 904, and 906 and/or at least some of their various sub-components may be implemented in hardware, software executed by a processor, firmware, or any combination thereof. If implemented in software executed by a processor, the functions of the random access manager 902, coverage enhancement manager 904, communication manager 906 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The random access manager 902, coverage enhancement manager 904, communication manager 906 and/or at least some of their various sub-components may be physically located at various positions, including being distributed such that portions of functions are implemented at different physical locations by one or more physical devices. In some examples, random access manager 902, coverage enhancement manager 904, communication manager 906 and/or at least some of their various sub-components may be a separate and distinct component in accordance with various aspects of the present disclosure. In other examples, random access manager 902, coverage enhancement manager 904, communication manager 906 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

Figure 10:
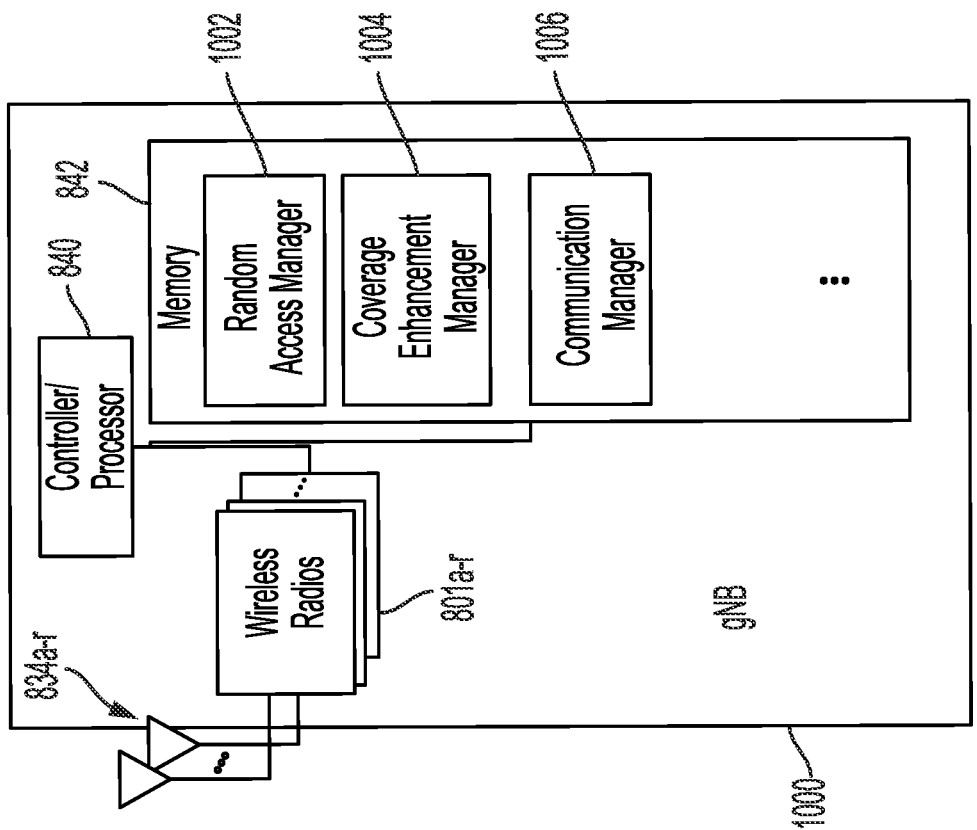
FIG. 10 is a block diagram illustrating a base station configured according to some embodiments of the present disclosure.

Referring now to FIG. 10, a base station 1000, such as a base station 105 (see FIG. 8), may have a controller/processor 840, a memory 842, and antennas 834a through 834t, as described above. The base station 1000 may also have wireless radios 801a to 801t that comprise additional components also described above with reference to FIG. 8. The memory 842 of base station 1000 stores one or more algorithms that configure processor/controller 840 to carry out one or more procedures as described above with reference to FIG. 7.

One or more algorithms stored by memory 842 configure processor/controller 840 to carry out one or more operations relating to wireless communication by the base station 1000, as previously described. For example, a random access manager 1002 configures controller processor 840 to carry out operations that include coordinating random access procedures and generating or receiving random access messages, as described above with reference to FIG. 2 and FIG. 3, for transmission and reception using wireless radios 801a-r and antennas 834a-r. The random access messages may include contention resolution messages (e.g., MsgA or Msg4) and PUCCH transmissions, comprising HARQ-ACK in response to reception of the contention resolution messages, transmitted by UE 900 to gNB 1000. A coverage enhancement manager 1004 may configure controller/processor 840 to determine a PUCCH resource for the PUCCH transmission prior to receiving a dedicated PUCCH resource configuration and determine a repetition level for the PUCCH transmission. Also, a communication manager 906 may configure controller/processor 740 to carry out operations including transmitting information scheduling the PUCCH transmission, transmitting the repetition level for the PUCCH transmission, and receiving the PUCCH transmission according to the repetition level, via wireless radios 801a to 801r and antennas 834a to 834r. Other operations as described above may be carried out by one or more of the described algorithms or components 1002, 1004, 1006 and/or their various subcomponents.

Each of the illustrated components 1002, 1004, and 1006 and/or at least some of their various sub-components may be implemented in hardware, software executed by a processor, firmware, or any combination thereof. If implemented in software executed by a processor, the functions of the random access manager 1002, coverage enhancement manager 1004, communication manager 1006 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The random access manager 1002, coverage enhancement manager 1004, communication manager 1006 and/or at least some of their various sub-components may be physically located at various positions, including being distributed such that portions of functions are implemented at different physical locations by one or more physical devices. In some examples, random access manager 1002, coverage enhancement manager 1004, communication manager 1006 and/or at least some of their various sub-components may be a separate and distinct component in accordance with various aspects of the present disclosure. In other examples, random access manager 1002, coverage enhancement manager 1004, communication manager 1006 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
    determining a Physical Uplink Control Channel (PUCCH) resource for a scheduled PUCCH transmission that is scheduled prior to receiving a dedicated PUCCH resource configuration;
    determining a repetition level for the scheduled PUCCH transmission; and
    transmitting the scheduled PUCCH transmission, on at least the PUCCH resource, according to the repetition level,
        wherein transmitting the scheduled PUCCH transmission comprises performing intra-slot repetition of the scheduled PUCCH transmission based on a number of Orthogonal Frequency Division Multiplexing (OFDM) symbols of the scheduled PUCCH transmission or a location of a first OFDM symbol of the scheduled PUCCH transmission, and
        wherein performing the intra-slot repetition includes transmitting at least one repetition of the scheduled PUCCH transmission on a repetition resource that is prior, in a time domain, to the PUCCH resource used for transmitting the scheduled PUCCH transmission.

2. The method of claim 1, wherein the scheduled PUCCH transmission contains a Hybrid Acknowledge Repeat Request Acknowledgement (HARCK-ACK) message in response to receiving a contention resolution message on a Physical Downlink Shared Channel (PDSCH) in a random access procedure.

3. The method of claim 2, further comprising receiving the repetition level in a Downlink Control Information (DCI) message for scheduling the contention resolution message.

4. The method of claim 3, wherein the repetition level is indicated in a Downlink Assignment Indicator (DAI) of the DCI message.

5. The method of claim 1, further comprising receiving the repetition level in system information signaling.

6. The method of claim 1, wherein the repetition level is determined based on a repetition level for a message 3 Physical Uplink Shared Channel (PUSCH) transmission or a message A PUSCH transmission.

7. The method of claim 1, wherein the repetition level is determined based on the number of OFDM symbols of the scheduled PUCCH transmission.

8. The method of claim 1, wherein the transmitting the scheduled PUCCH transmission comprises:
    determining a type of frequency hopping for the scheduled PUCCH transmission, wherein the type of frequency hopping includes intra-slot frequency hopping or inter-slot frequency hopping; and
    transmitting the scheduled PUCCH transmission according to the determined type of frequency hopping.

9. The method of claim 8, wherein determining the type of frequency hopping includes receiving an indication of the type of frequency hopping to use for the scheduled PUCCH transmission.

10. The method of claim 8, wherein determining the type of frequency hopping comprises selecting intra-slot frequency hopping if a length of each PUCCH repetition is greater than a threshold number of OFDM symbols or inter-slot hopping if the length is less than the threshold number of OFDM symbols.

11. The method of claim 8, wherein determining the type of frequency hopping is based on a fixed type of frequency hopping specified for the scheduled PUCCH transmission.

12. The method of claim 1, further comprising:
receiving a set of cyclic shift indexes for applying cyclic shifts to the scheduled PUCCH transmission;
determining a first cyclic shift to apply to a first repetition of the scheduled PUCCH transmission based on a first index of the set of cyclic shift indexes;
identifying at least one second cyclic shift to apply to a second repetition of the scheduled PUCCH transmission using an index subsequent to the first index in the set of cyclic shift indexes; and
applying the first cyclic shift to the first repetition of the scheduled PUCCH transmission and the second cyclic shift to the second repetition of the scheduled PUCCH transmission.

13. An apparatus for wireless communications, comprising:
a processor;
memory coupled with the processor; and
instructions stored in the memory and operable, when executed by the processor, to cause the apparatus to:
determine a Physical Uplink Control Channel (PUCCH) resource for a scheduled PUCCH transmission that is scheduled prior to receiving a dedicated PUCCH resource configuration;
determine a repetition level for the scheduled PUCCH transmission; and
transmit the scheduled PUCCH transmission, on at least the PUCCH resource, according to the repetition level,
wherein transmitting the scheduled PUCCH transmission comprises performing intra-slot repetition of the scheduled PUCCH transmission based on a number of Orthogonal Frequency Division Multiplexing (OFDM) symbols of the scheduled PUCCH transmission or a location of a first OFDM symbol of the scheduled PUCCH transmission, and
wherein performing the intra-slot repetition includes transmitting at least one repetition of the scheduled PUCCH transmission on a repetition resource that is prior, in a time domain, to the PUCCH resource used for transmitting the scheduled PUCCH transmission.

14. The apparatus of claim 13, wherein the scheduled PUCCH transmission contains a Hybrid Acknowledge Repeat Request Acknowledgement (HARCK-ACK) message in response to receiving a contention resolution message on a Physical Downlink Shared Channel (PDSCH) in a random access procedure.

15. The apparatus of claim 14, further comprising instructions operable to cause the apparatus to receive the repetition level in a Downlink Assignment Indicator (DAI) of a Downlink Control Information (DCI) message for scheduling the contention resolution message.

16. The apparatus of claim 13, further comprising instructions operable to cause the apparatus to receive the repetition level in system information signaling.

17. The apparatus of claim 13, wherein the repetition level is determined based on a repetition level for a message 3 Physical Uplink Shared Channel (PUSCH) transmission or a message A PUSCH transmission.

18. The apparatus of claim 13, wherein the repetition level is determined based on a number of OFDM symbols of the scheduled PUCCH transmission.

19. The apparatus of claim 13, wherein the transmitting the scheduled PUCCH transmission comprises:
determining a type of frequency hopping for the scheduled PUCCH transmission, wherein the type of frequency hopping includes intra-slot frequency hopping or inter-slot frequency hopping; and
transmitting the scheduled PUCCH transmission according to the determined type of frequency hopping.

20. The apparatus of claim 19, wherein determining the type of frequency hopping includes receiving an indication of the type of frequency hopping to use for the scheduled PUCCH transmission.

21. The apparatus of claim 19, wherein determining the type of frequency hopping comprises selecting intra-slot frequency hopping if a length of each PUCCH repetition is greater than a threshold number of OFDM symbols or inter-slot hopping if the length is less than the threshold number of OFDM symbols.

22. The apparatus of claim 19, wherein determining the type of frequency hopping is based on a fixed type of frequency hopping specified for the scheduled PUCCH transmission.

23. The apparatus of claim 13, further comprising instructions operable to cause the apparatus to:
receive a set of cyclic shift indexes for applying cyclic shifts to the scheduled PUCCH transmission;
determine a first cyclic shift to apply to a first repetition of the scheduled PUCCH transmission based on a first index of the set of cyclic shift indexes;
identify at least one second cyclic shift to apply to a second repetition of the scheduled PUCCH transmission using an index subsequent to the first index in the set of cyclic shift indexes; and
apply the first cyclic shift to the first repetition of the scheduled PUCCH transmission and the second cyclic shift to the second repetition of the scheduled PUCCH transmission.

24. An apparatus for wireless communications, comprising:
means for determining a Physical Uplink Control Channel (PUCCH) resource for a scheduled PUCCH transmission that is scheduled prior to receiving a dedicated PUCCH resource configuration;
means for determining a repetition level for the scheduled PUCCH transmission; and
means for transmitting the scheduled PUCCH transmission, on at least the PUCCH resource, according to the repetition level,
wherein transmitting the scheduled PUCCH transmission comprises performing intra-slot repetition of the scheduled PUCCH transmission based on a number of Orthogonal Frequency Division Multiplexing (OFDM) symbols of the scheduled PUCCH transmission or a location of a first OFDM symbol of the scheduled PUCCH transmission, and
wherein performing the intra-slot repetition includes transmitting at least one repetition of the scheduled PUCCH transmission on a repetition resource that is prior, in a time domain, to the PUCCH resource used for transmitting the scheduled PUCCH transmission.

25. The apparatus of claim 24, wherein the scheduled PUCCH transmission contains a Hybrid Acknowledge Repeat Request Acknowledgement (HARCK-ACK) message in response to receiving a contention resolution message on a Physical Downlink Shared Channel (PDSCH) in a random access procedure.

26. The apparatus of claim 25, further comprising:
means for receiving the repetition level in a Downlink Control Information (DCI) message for scheduling the contention resolution message.

27. The apparatus of claim 26, wherein the repetition level is indicated in a Downlink Assignment Indicator (DAI) of the DCI message.

28. The apparatus of claim 24, further comprising:
means for receiving the repetition level in system information signaling.

29. The apparatus of claim 24, wherein the repetition level is determined based on a repetition level for a message 3 Physical Uplink Shared Channel (PUSCH) transmission or a message A PUSCH transmission.

30. The apparatus of claim 24, wherein the repetition level is determined based on the number of OFDM symbols of the scheduled PUCCH transmission.

* * * * *